(12) United States Patent
Wang et al.

(10) Patent No.: US 11,319,215 B2
(45) Date of Patent: May 3, 2022

(54) MULTI-STAGE SEDIMENTATION RAKE-FREE THICKENING DEVICE

(71) Applicant: ANHUI UNIVERSITY OF SCIENCE & TECHNOLOGY, Huainan (CN)

(72) Inventors: Chao Wang, Huainan (CN); Erning Zhao, Huainan (CN); Mengmeng Wang, Huainan (CN); Biao Hu, Huainan (CN); Chengliang Qiu, Huainan (CN); Xueqing Jiang, Huainan (CN); Xiong Xiao, Huainan (CN); Chengpeng Duan, Huainan (CN); Yang Li, Huainan (CN); Jiaqiang Zhou, Huainan (CN); Jin Zhang, Huainan (CN); Yu Zhang, Huainan (CN)

( * ) Notice: Subject to any disclaimer, the term of this patent is extended or adjusted under 35 U.S.C. 154(b) by 0 days.

(21) Appl. No.: 17/035,686

(22) Filed: Sep. 29, 2020

(65) Prior Publication Data

US 2021/0179444 A1 Jun. 17, 2021

(51) Int. Cl.
*C02F 1/00* (2006.01)
*C02F 1/20* (2006.01)
(Continued)

(52) U.S. Cl.
CPC .......... *C02F 1/006* (2013.01); *B01D 21/0009* (2013.01); *B01D 21/2416* (2013.01);
(Continued)

(58) Field of Classification Search
CPC .. C02F 1/006; C02F 1/20; C02F 1/488; C02F 1/5281; C02F 2001/007; C02F 2103/10;
(Continued)

(56) References Cited

U.S. PATENT DOCUMENTS

2019/0366354 A1* 12/2019 Zhang ................... B03C 1/30

FOREIGN PATENT DOCUMENTS

CN 203954760 U * 11/2014
CN 105944407 A * 9/2016
(Continued)

OTHER PUBLICATIONS

Zhang (CN 108792036) machine translation and original attached. (Year: 2018).*

(Continued)

*Primary Examiner* — Liam Royce (57) ABSTRACT

Disclosed is a multi-stage sedimentation rake-free thickening device. The device includes a central tank. A diversion sedimentation zone is arranged on the outside of the center tank. The diversion sedimentation zone includes an annular diversion sedimentation screen and a concentrated magnetic shower. The annular diversion sedimentation screen includes an annular groove spirally arranged around a central groove body. The annular groove is sequentially arranged with second spoiler baffles along the length direction. The lower bottom plate of the annular groove is also provided with second underflow discharge port. Multiple second inclined plate diversion discharge pipe is arranged under the corresponding second underflow discharge ports. The outlets of all the second inclined plate guide discharge pipes are collected to the second underflow discharge pipe, and the settled water is discharged from the second overflow discharge pipe arranged at the end of the annular groove.

1 Claim, 10 Drawing Sheets

(51) Int. Cl.
  *C02F 1/48* (2006.01)
  *B01D 21/24* (2006.01)
  *B01D 21/00* (2006.01)
  *B03B 5/60* (2006.01)
  *B01D 21/08* (2006.01)
  *C02F 103/10* (2006.01)

(52) U.S. Cl.
  CPC ............ *B01D 21/2433* (2013.01); *B03B 5/60* (2013.01); *C02F 1/20* (2013.01); *C02F 1/488* (2013.01); *B01D 21/08* (2013.01); *C02F 2001/007* (2013.01); *C02F 2103/10* (2013.01); *C02F 2301/08* (2013.01)

(58) Field of Classification Search
  CPC .. C02F 2301/08; C02F 2305/12; C02F 11/14; C02F 11/15; C02F 11/121; B03B 5/60; B01D 21/0009; B01D 21/2433; B01D 21/2416; B01D 21/08; B01D 21/02; B01D 21/01; B01D 21/2405; B01D 19/02
  See application file for complete search history.

(56) References Cited

FOREIGN PATENT DOCUMENTS

| | | | |
|---|---|---|---|
| CN | 205730475 | U * | 11/2016 |
| CN | 108792036 | A * | 11/2018 |

OTHER PUBLICATIONS

Zhao (CN 205730475) machine translation and original attached. (Year: 2016).*
Zhai (CN 105944407) machine translation and original attached. (Year: 2016).*
Lu (CN 203954760) machine translation and original attached. (Year: 2014).*

* cited by examiner

MULTI-STAGE SEDIMENTATION RAKE-FREE THICKENING DEVICE

CROSS-REFERENCE TO RELATED APPLICATIONS

The application claims priority to Chinese patent application No. 201911285766.8, filed on Dec. 13, 2019, the entire contents of which are incorporated herein by reference.

TECHNICAL FIELD

The disclosure relates to the field of slime water treatment, and more specifically, to a multi-stage sedimentation rake-free thickening device.

BACKGROUND

In the coal washing and processing process, the slime water treatment is the final link of the washing process, which is the key to the effective collection and utilization of coal slime and the closed circuit of washing water. The thickening device has been widely used as a carrier and key equipment for the treatment of slime water, which is of great significance to the closed circulation of the washing water, the full utilization of the underflow concentrate and the environmental protection.

With the integration and large-scale coal washing plant, the processing capacity has been greatly increased, and the output of slime water and the content of fine mud in the slime water have also increased significantly. Therefore, the thickening device has to increase in diameter during the application process, and some equipment even have reached the diameter size of 45 m and above, and due to the finer sludge and the increase in the processing volume, the settlement time is short and the settlement effect is poor. The fine sludge in the washing circulating water cannot be effectively removed, which will seriously affect the quality of coal washing. Therefore, many coal preparation plants have added a second stage or even a third stage of concentration to further purify the washing circulating water, which will occupy a large amount of land, and still, there are residual coal foams in the washing stage that has not been fully recovered in the washing stage, resulting in waste of clean coal and great economic losses.

SUMMARY

In order to make full use of the multi-stage sedimentation technology to realize the multi-stage thickening combination in the thickening structure, and at the same time to use the defoaming technology to realize the recovery and utilization of the clean coal on the residual mineralized foam. The floor space will be greatly reduced and the recovery of clean coal will be increased. The multi-stage and diversified utilization of mud is realized by the addition of clean coal collection. The economic income has increased and the waste has been greatly reduced. Thus, the present disclosure provides a multi-stage sedimentation rake-free thickening device.

In order to achieve the above objectives, the present disclosure adopts the following technical solutions: providing a multi-stage sedimentation rake-free thickening device which includes a central tank. The outer side of the central tank is provided with a diversion sedimentation zone, and the diversion sedimentation zone includes an annular diversion sedimentation screen and a concentrated magnetic shower. The annular diversion sedimentation screen includes an annular groove spirally arranged around the central tank. The annular groove is sequentially arranged with second spoiler baffle. The lower bottom plate of the annular groove is also provided with a second underflow discharge port and a second inclined plate guide discharge pipe is provided below multiple second underflow discharge ports. Outlets of the second inclined plate guide discharge pipe converge to the second underflow discharge pipe. Settled water is discharged from the second overflow discharge pipe arranged at an end of the annular groove.

The advantages of the present disclosure are described as follows.

The diversion and sedimentation zone of the disclosure includes an annular diversion sedimentation screen and a concentrated magnetic shower. The second spoiler baffle is being used in the annular diversion sedimentation screen to achieve gradual sedimentation, and the fine coal slime and the settled water are removed from different tubes to achieve concentration.

The device realizes the structural integration of traditional multi-stage thickening tanks, which greatly reduces the occupied area of traditional multi-stage thickening tanks.

In this device, the central collection area of the clean coal collection assembly is set in the central tank body, the foam is collected to the center through the first baffle, the fluid is gradually settled in the radial direction, and the overflow water is collected by itself to realize the unpowered flow of the fluid.

Realize the separation of coarse slime products and fine slime products. Coarse slime products can be used as coal blending for mid-coal products for it's high coal content, thus increasing economic income, reducing waste, achieving concentrated accumulation and discharge of fine slime products, reducing pollution, and achieving more sufficient separation of fine mud and water and greatly improving the deterioration of the washing process caused by circulating water.

Whether the fine mud can settle in the thickening device mainly depends on the movement distance of the fine particles in the vertical direction. The setting of the high and low baffles in the diversion settling screen can make the slime water obtain sufficient settling time in the limited space and achieve the full sedimentation of the fine mud.

The setting of the defoamer can realize the desorption of the concentrate on the residual mineralized bubbles by means of pulsation hammering, while the jet water can still realize the flushing and collection of the wall concentrate.

The magnetic gathering sprayer is set up to use magnetic particles as the magnetic seed to strengthen the adhesion of the flocculant, thereby accelerating the adhesion of the fine mud and the flocculant, realizing the accelerated sedimentation of the fine mud, and further realizing the full separation of mud and water.

The vortex-shaped first baffle can reduce the turbulence of the jet inflow material in the central tank, optimize the sedimentation environment of the slime, and facilitate the sedimentation; at the same time, it does not require the traditional mixing harrow, which completely solves the "harrowing" phenomenon, ensuring the continuous and stable operation of the thickening device.

The setting of the feeding component realizes the addition of flocculating agent through the ejection effect, and at the same time, the sudden expansion and contraction of the fluid causes the pressure difference to change, resulting in increased turbulence, so as to achieve the full mixing of the flocculant and the slurry.

DETAILED DESCRIPTION OF THE EMBODIMENTS

A multi-stage sedimentation rake-free thickening device is provided. The device includes a feed assembly 1, a guide assembly 2, and a clean coal collection assembly 3. The guide assembly 2 includes a central groove body 21 with a cylindrical part at the upper end and a funnel part at the lower end. The central groove body 21 has a cavity structure. The feed assembly 1 is arranged above the cavity of the central groove body 21. The lower end of the central groove body 21 is provided with a first discharge port 24. The coarse slime gradually sinks to the top of the first discharge port 24 of the central tank body 21 and deposits to a certain amount, and is discharged through the first discharge port 24. The collected materials discharged from the first discharge port 24 can be used for blending of medium coal or as building materials to increase economic income.

Figure 1:
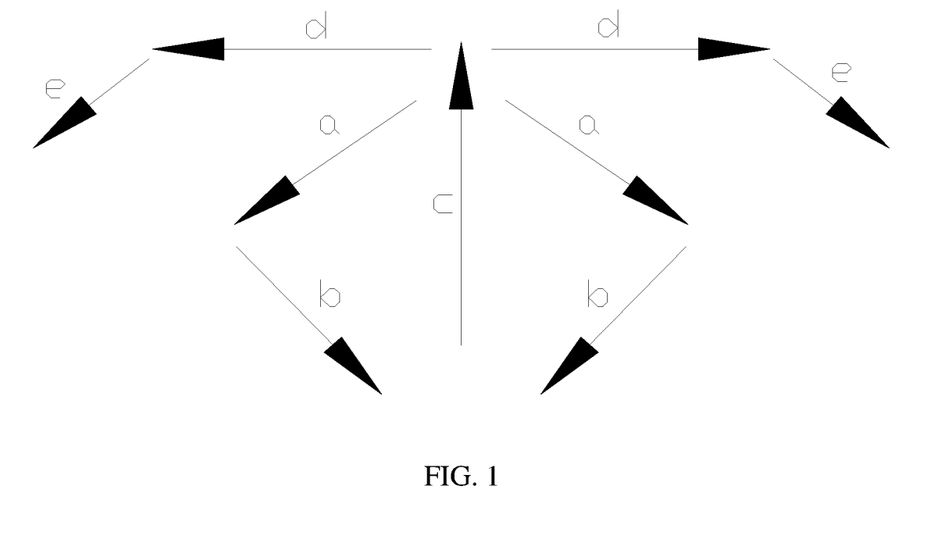
FIG. 1 is a schematic diagram of the flow direction of slime water in the present disclosure.

Referring to FIG. 1, the materials and treatment agents are fed into the guide assembly 2 through the feed assembly 1. As is also shown in FIG. 1, the direction a in FIG. 1 indicates that the materials and treatment agents diffuse outward from the middle, and then converge toward the middle through the guide assembly 2, as is shown in FIG. 1, direction b. The setting of a direction and b direction increases the flow path of materials and treatment agents, thereby increasing the reaction time and enhancing the reaction effect. After the reaction is completed, the coarse slime gradually settles, and the fine slime water floats upward along path c along with residual mineralized bubbles, and the floating residual mineralized bubbles and fine coal slime enter the clean coal collection assembly 3. The movement direction in the clean coal collection assembly 3 is d, and finally the separated water and the settled clean coal are discharged from the outer side of the central tank body 21 in the e direction. The clean coal collection assembly 3 collects residual mineralized air bubbles above the center of the central tank body 21, and the fine coal slime moves to the edge of the central tank body 21 in the direction of d. In this process, the bubbles are eliminated, and the sedimentation zone is set in the elimination area. After sedimentation, water and sedimentation fine slime can be separated.

The components are described in detail below.

Figure 2:
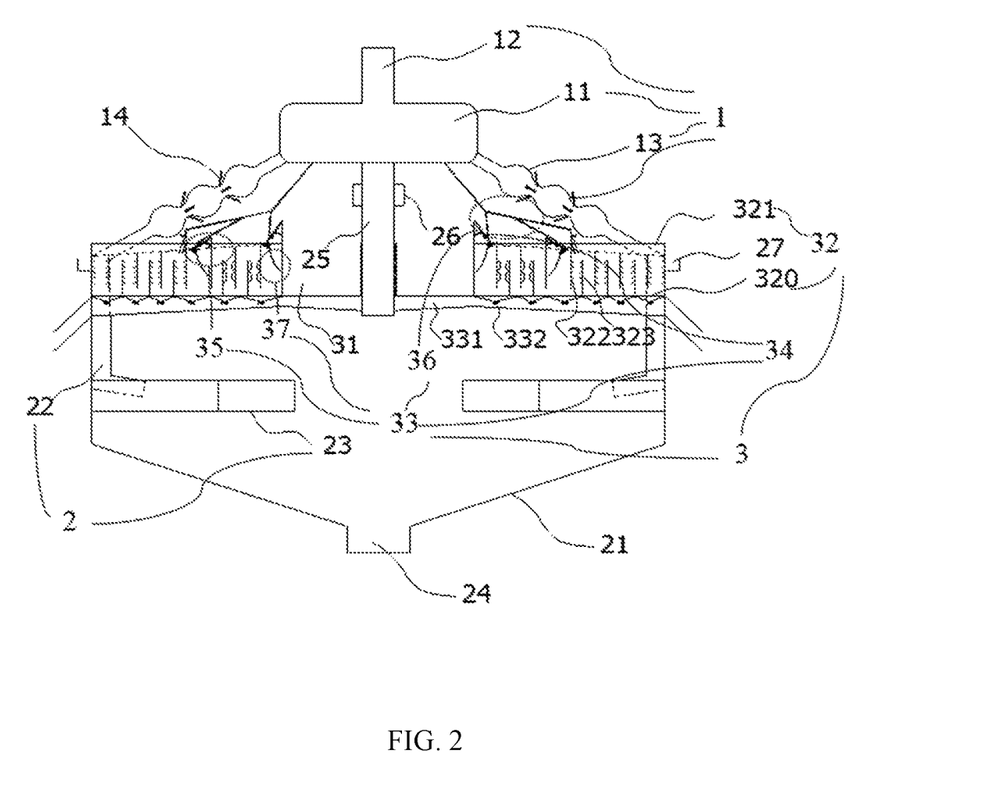
FIG. 2 is a structural diagram of the entire device when the diversion settlement zone is the first embodiment.
Figure 3:
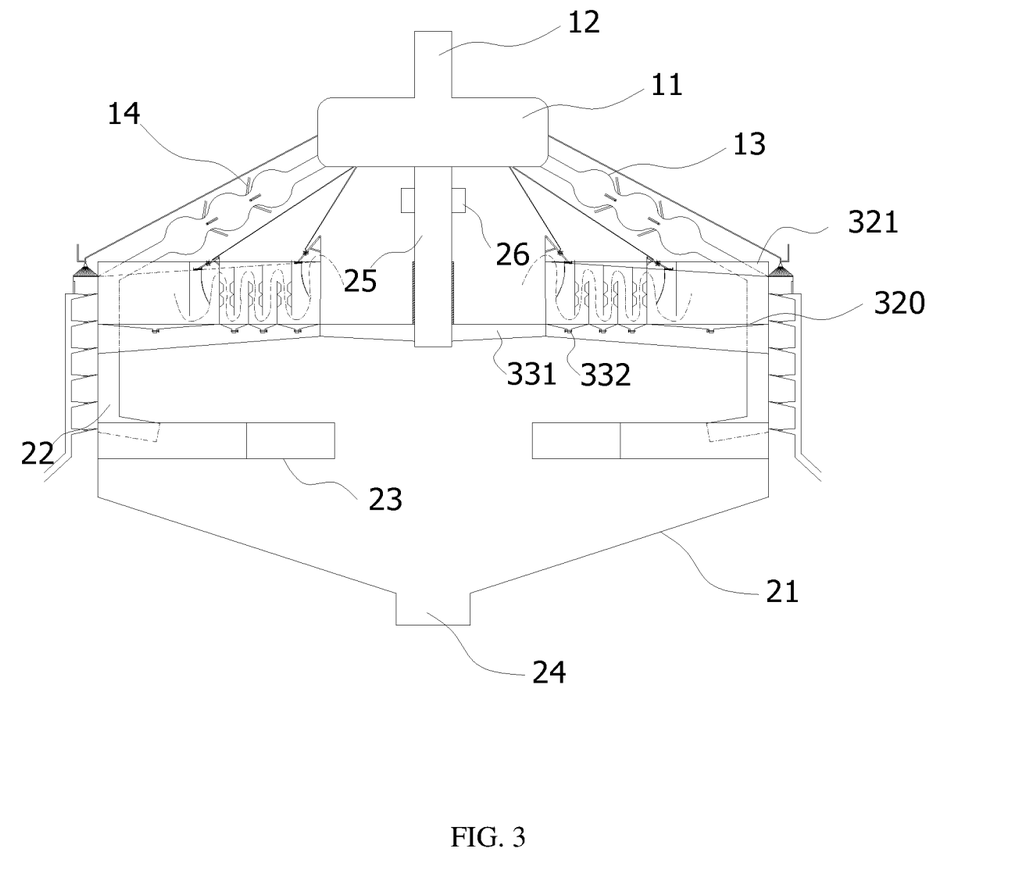
FIG. 3 is a structural diagram of the entire device when the diversion settlement zone is the second embodiment.
Figure 4:
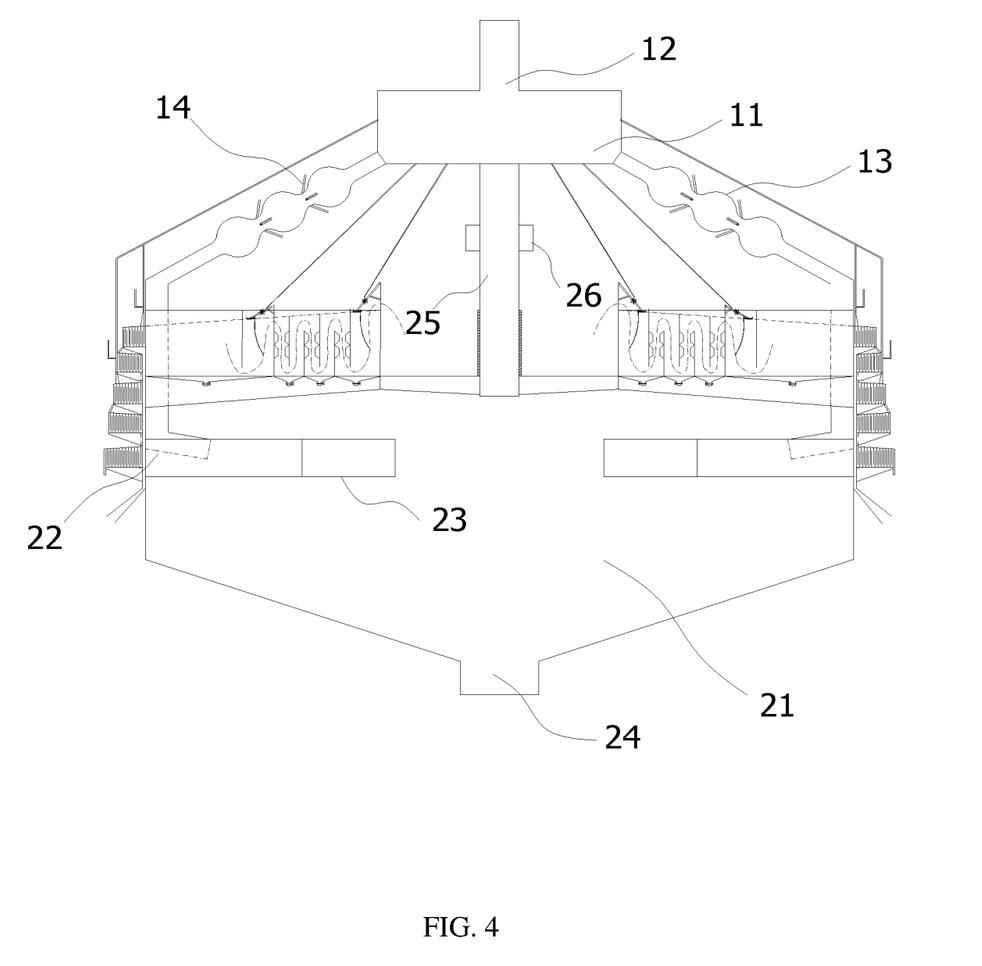
FIG. 4 is a structural diagram of the entire device when the diversion settlement zone is the third embodiment.
Figure 5:
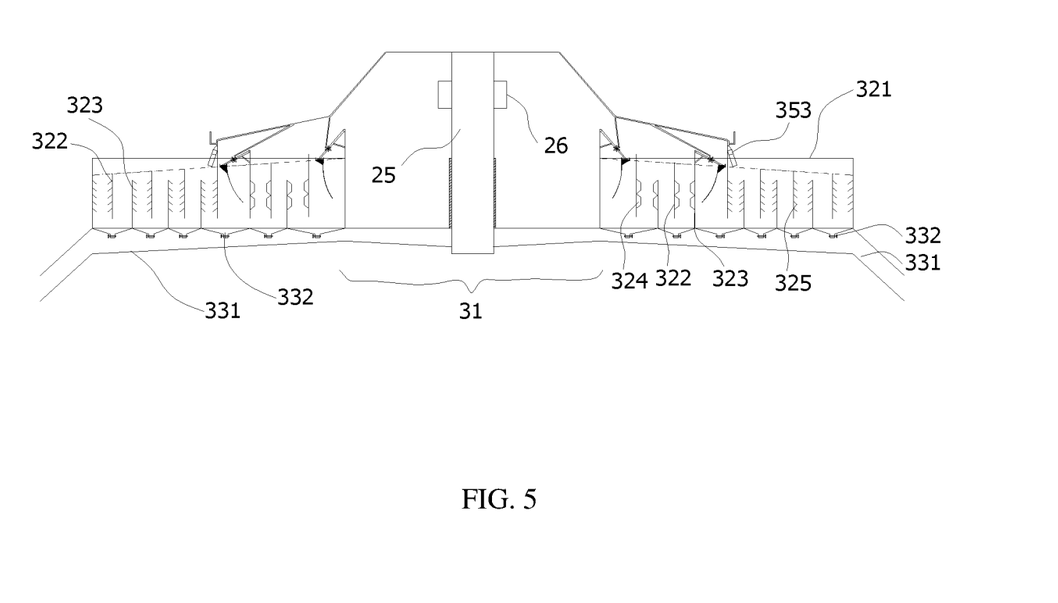
FIG. 5 is the structure diagram of the clean coal collection assembly when the diversion settlement zone is the first embodiment.

As shown in FIGS. 2-4, the feed assembly 1 includes a feeding distribution tank 11, a main feeding pipe 12, a reducing pipe 13, and a treatment agent ejector 14. Multiple reducing pipes 13 are evenly distributed between the feeding distribution groove 11 and the side wall of the central groove body 21.

The material is input into the feeding distribution tank 11 through the main feeding pipe 12, and multiple reducing pipes 13 in an annular array are provided between the lower part of the feeding distribution tank 11 and the inner wall of the cylindrical part of the central tank body 21. In this embodiment, the reducing tube 13 is composed of a round ball and a round tube, forming a gourd-like tube with alternating sudden expansion and sudden contraction.

The treatment agent ejector 14 is evenly distributed at the constriction of the reducing tube 13 and is connected to the round tube at the constriction. Because the flow velocity at the constriction suddenly increases, the junction of the treatment agent ejector 14 and the reducing tube 13 forms a negative pressure, it has a good suction effect on the flocculant in the treatment agent ejector 14. At the sudden expansion, the pressure increases, the flow rate slows down, the turbulence intensity increases at this moment, and the flocculant and slime water are fully mixed.

The opening degree of the inlet of the treatment agent ejector 14 can be controlled by a superior valve to control the inhalation of the treatment agent. The material and the treatment agent are mixed by the suction effect of the reducing tube 13 and the treatment agent slurry.

The bottom of the feeding distribution trough 11 is provided with a central support column 25, and the central support column 25 is provided with a horizontal support rod 26. The horizontal support rod 26 supports the feeding assembly 1 through components outside the device.

In this embodiment, the reducing pipe 13 is used as the output end of the feed assembly 1, and the slime water is diverted from the feed distribution tank 11 to the outside.

Figure 13:
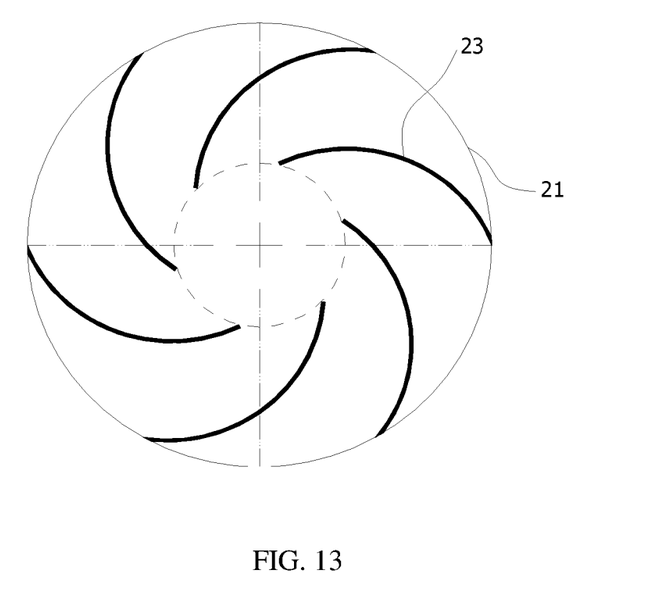
FIG. 13 is a top view of the first baffle in the central tank.

Referring to FIGS. 2-4, the guide assembly 2 includes ejecting inlet pipe 22 and the first baffle 23. The input end of the ejecting inlet pipe 22 is connected to the outlet end of the feed assembly 1. One end of the plate 23 is fixed on the inner wall of the cylindrical part of the central groove body 21, and the other end extends to the middle of the central groove body 21. In this embodiment, each ejecting inlet pipe 22 is connected to the output end of the corresponding reducing tube 13, and a corresponding first baffle 23 is provided below the outlet of each ejecting inlet pipe 22. The mixed fluid is injected into the first baffle 23 of the central tank body 21 through the ejecting inlet pipe 22, and the slime water is uniformly and orderly distributed on the central tank body under the action of the first baffle plate 23. The materials and treatment agents are mixed and reacted in this area and the central tank body 21, and the coarse slime gradually settles to the deep cone of the central tank body 21 for deposition, and reaches a certain amount of deposition and is discharged through the first discharge port 24. In this embodiment, as shown in FIG. 13, the first baffles 23 are all distributed in a vortex shape, and six ejecting inlet pipes 22 are provided in an annular array. The spiral structure increases the circulation path of materials and treatment agents.

The clean coal collection assembly 3 includes a central collection area 31 surrounding the support column 25, multiple defoaming areas, and a settling area corresponding to the defoaming area. Multiple deforming areas are arrayed in an annular shape between the central collection area 31 and the inner wall of the cylindrical portion. The first baffle 23 in the baffle assembly 2 and the output end of the ejecting inlet pipe 22 are both located below the defoaming area.

As shown in FIGS. 2-6 and 8, the central collection area 31 is a circular groove structure with an upward opening. The circular groove structure is sleeved on the support column 25. After the material reacts with the treatment agent, the fine slime water generates bubbles in the reaction of the treatment agent, and moves up to the central collection area 31 with the clean coal.

As shown in FIGS. 2-6 and 8, the bubble defoaming area includes a first diversion sedimentation screen 32 and a defoamer located at a pre-set position above the first diversion sedimentation screen. Multiple defoamers are arranged in sequence along the fluid flow direction, thereby improving the defoaming effect.

The first diversion sedimentation screen 32 includes a first diversion area formed by side plates 321 on both sides and a lower plate body 320. The lower plate body 320 and the first underflow discharge pipe 331 underneath are communicated through the first discharge valve 332, so that the clean coal deposited at the bottom can be recycled. One end of the first underflow discharge pipe 331 is sealed and fixed on the support column 25, and the other end extends out of the central tank 21. By regularly opening the first discharge valve 332, the material with clean coal deposited on the lower plate 320 can be discharged. The upper end of the side plate 321 is higher than the outer edge of the central collection area 31 such that the material overflowing from the central collection area 31 to the first diversion area will not directly overflow, and will be processed by the clean coal collection assembly. The height of the upper end of the high board 322 of the first diversion area gradually decreases along the radial direction of the cylindrical portion.

In a preferred embodiment, the first diversion area is alternately provided with high board 322 and low board 323 along the fluid flow direction. The high board 322 and the low board 323 are offset up and down, and are fixed between the two side plates 321 at intervals. The fluid flows through the lower end of the high board 322 and the upper end of the low board 323, increasing the sedimentation rate of the fine slime fluid. The left side of the first discharge valve 332 at each lower plate 320 is a high board 322 and the right side is a low board 323.

Preferably, the upwelling section enclosed by the high board 322 and the low board 323 of the first diversion settling screen 32 is provided with a sudden contraction and expansion spoiler 324, which increases the secondary enrichment effect of the escaped foam and eliminates fine slime. Facilitate the recovery of the hammer blow at the back end of the bubble elimination zone.

Figure 6:
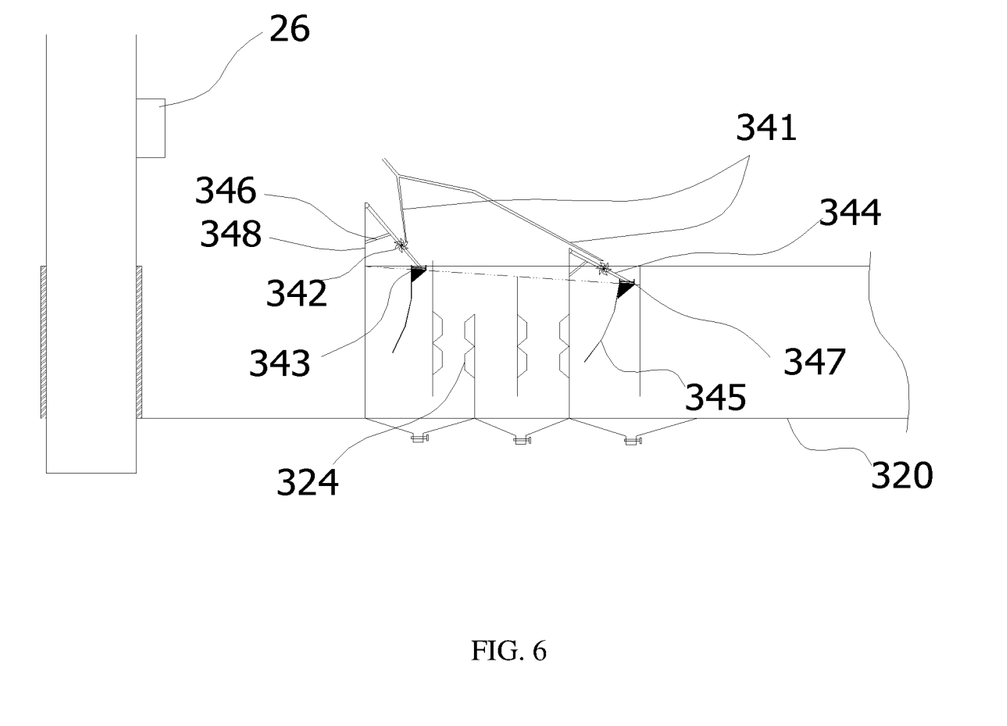
FIG. 6 is a schematic diagram of the structure of the bubble extinguishing zone when the diversion settlement zone is the first embodiment.

Referring to FIG. 6, each bubble deforming zone includes multiple bubble defoamer 33 arranged along the radial direction of the cylindrical portion, and the bubble defoamer 33 includes a supporting unit 34, a hammering unit 35, a driving unit 36, and a flow guiding unit 37.

The supporting unit 34 includes a bracket 348. The first bracket 348 is fixed above the board where the first diversion area and the central collection area 31 intersect, and the other brackets 348 are fixed on the upper end surface of the high board 322. Specifically, the bracket 348 is formed by two side rods and a supporting plate below to form a tripod, which not only plays a supporting role, but also does not affect the entering of materials into the first diversion area and the flowing in the first diversion area.

The hammering unit 35 includes a hammering defoaming plate 343, a clean coal collecting tank 347 and a hammering rod 344. One end of the hammering rod 344 is hinged with the bracket 348, and the other end is hinged with the hammering defoaming plate 343, and the clean coal collecting trough 347 is fixed on the side plate 321.

The driving unit 36 includes an impact tube 341, a grooved roller 342, and a reciprocating spring 346. The upper end of the impact tube 341 is communicated with the feed distribution trough 11, and the lower end is opposite to the inner wall of the clean coal collection trough 347 on the grooved roller 342. The middle part of the hammer rod 344 is connected to the middle part of the two side rods of the bracket 348 through a reciprocating spring 346. The grooved roller 342 is arranged on the hammer rod 344 and is connected by a rotating shaft. The hammering defoaming plate 343 hammers downwardly, and the amount of deflection along the center is smaller than the compression amount of the reciprocating spring 346 after the hammer rod 344 is impacted. When the material in the feed distribution tank 11 flows from the impact tube 341 into the grooved roller 342, the grooved roller 342 is rotated at a non-uniform speed. Due to the increase in the mass of the entire drive unit and the hammer unit, the reciprocating spring 346 is in a compressed state, and the hammering defoaming plate 343 is compressed into the clean coal collecting tank 347 until there is too much material in the grooved roller 342, which causes the roller to rotate and dump all the materials. The energy accumulated by the reciprocating spring 346 makes the hammering defoaming plate 343 away from the clean coal collecting trough 347, and the periodic motion realizes that the hammering defoaming plate 343 reciprocally beats the clean coal collecting trough in the clean coal collecting trough 347 to achieve defoaming. The slime water thrown out of the impact tube 341 will also wash the clean coal on the hammering defoaming plate 343, so that the clean coal is discharged from the concentrate discharge port into the clean coal collection tank 347 and collected.

The diversion unit 37 includes a diversion bent plate 345. The diversion bent plate 345 is arranged in the lower section of the clean coal collecting trough 347, and is placed in the downflow interval enclosed by the high board 322 and the low board 323 of the first diversion sedimentation screen. When the mineralized foam enters the defoaming zone, it rises to the entrance of the clean coal collection trough 347 along the guide curved plate 345 in the roller pulse defoaming device, and enters the clean coal collection trough 347.

In summary, the unsettled fine coal slime and the mineralized foam regenerated due to residual flotation reagents and clean coal are collected together with the water flow into the central collection area 31. Then it diverges to the first diversion settling screen 32, and passes through the second diversion settling screen. The slime water containing fine slime flows in the radial direction to the edge of the central tank 21.

Figure 7:
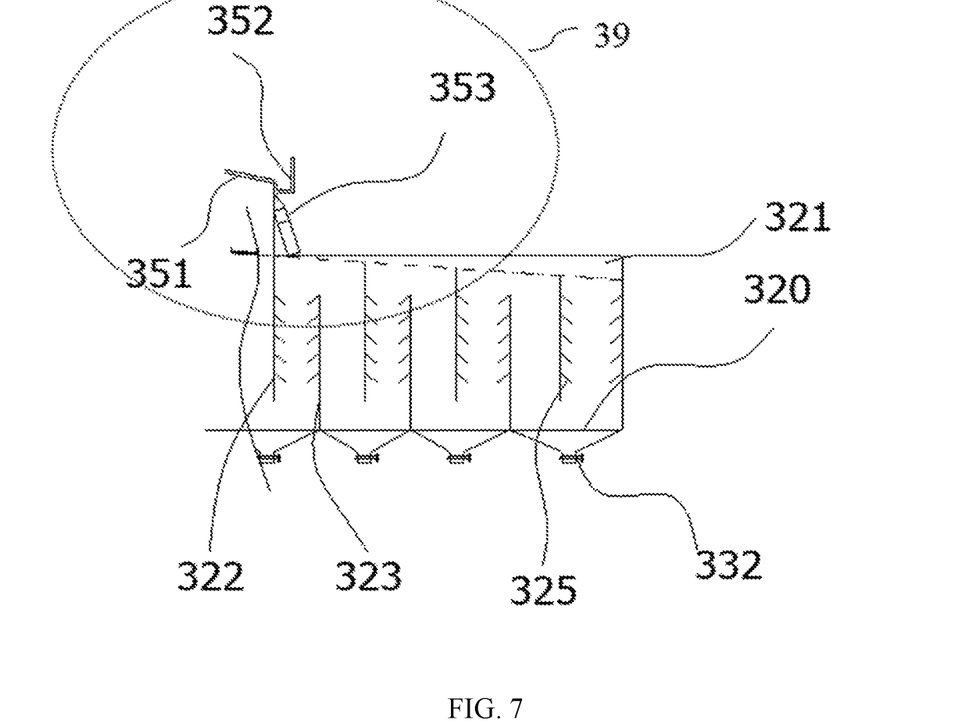
FIG. 7 is a structural diagram when the diversion settlement zone is the first embodiment.
Figure 8:
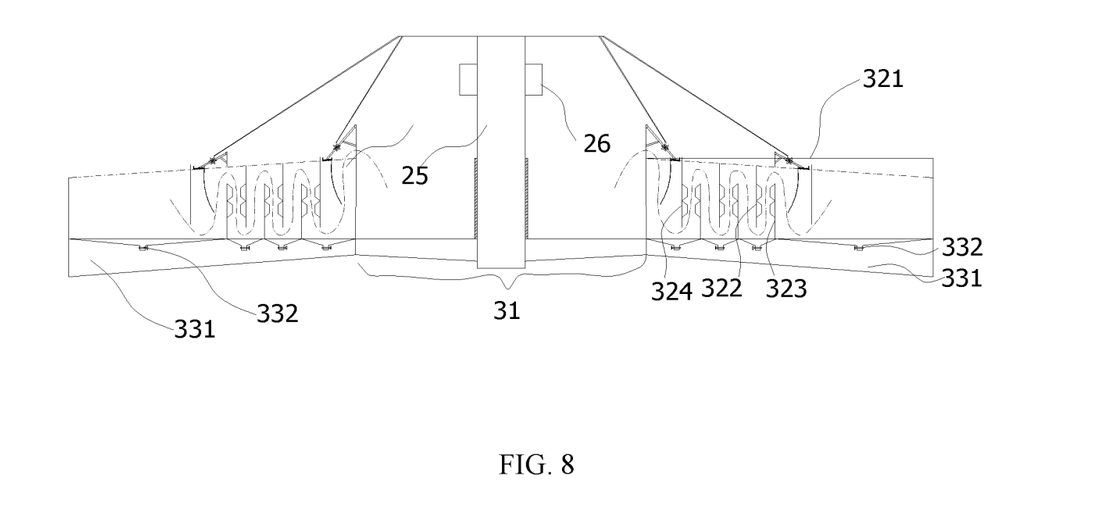
FIG. 8 is the structure diagram of the bubble extinguishing zone when the diversion settlement zone is the second and third embodiments.

Multiple embodiments for the diversion and settlement zone, as described below:

As shown in FIGS. 2 and 7, the multiple diversion and sedimentation zones are provided, which are correspondingly arranged behind the defoaming zone, and are all located between the central collection area 31 and the inner side wall of the central tank body 21. The diversion sedimentation zone includes a second diversion sedimentation screen 38 and a magnetic concentrating shower 39 located at a pre-set position above the second diversion sedimentation screen.

As shown in FIGS. 2 and 7, the second diversion sedimentation screen 38 and the first diversion sedimentation screen 32 are integrated, and the sudden contraction and expansion spoiler 324 in the first diversion sedimentation screen is replaced with a spoiler sinker 325, thereby increasing the interference settlement effect of fine slime, other structures are the same. Specifically, the outermost high board 322 has the same height as the side wall of the central tank body 21, so that the bubble-defying fluid can overflow. An overflow groove 27 is annularly provided on the outer side wall of the upper end of the cylindrical portion of the central groove body 21. The first diversion sedimentation screen 32 and the second diversion sedimentation screen 38 cooperate to realize the multi-stage sedimentation of the slime water, avoid the installation of the second-stage thickener, reduce the floor space, and at the same time, through the second-stage central collection, the multi-stage diversion sedimentation method provides sufficient sedimentation time for fine mud.

As shown in FIG. 7, the magnetic concentrating shower 39 includes a first magnetic-concentrating ejection tube 351, a first magnetic powder feeding pipe 352, and a first distributor 353. The magnetic concentrating shower 39 is arranged on the high board 322 of the upper entrance of the second diversion sedimentation screen. The upper end of the first magnetism collecting and ejecting tube 351 also communicates with the feed distribution trough 11. The lower end of the first magnetism collecting and ejecting tube 351 communicates with the first distributor 353. One end of the first magnetic powder feed pipe 352 is connected with the pipe at the magnetic powder supply, and the other end is connected with the first magnetism collecting ejection tube 351. The lower outlet of the first distributor 353 is fan-shaped, and is separated by multiple partitions, so that the magnetism collecting material is evenly flows along the edge of the deflector fixed on the high board 322, thus, realizing the accelerated settlement of the fine slime. When the slime water passes through the second diversion settling screen 38, the magnetic concentration sprayer 39 sprays the magnetic seeds to obtain efficient settlement. The slime water again circulates through the bottom of the high board 322 step by step, and then overflows through the top of the low board 323 to the bottom. A tank is formed between the high board 322 and the low board 323. During this process, the fine slime passes through the interference settling of the flow-spoiler settling plate 325 to get sufficient settlement, and will be separated from the water completely, and the fine slime will be deposited to the lower plate 320, and then discharged from the first underflow discharge pipe 331. The overflow water settled through the second diversion settling screen is discharged into the overflow tank 27, and enters the washing process again as circulating water to realize closed circulation.

Figure 9:
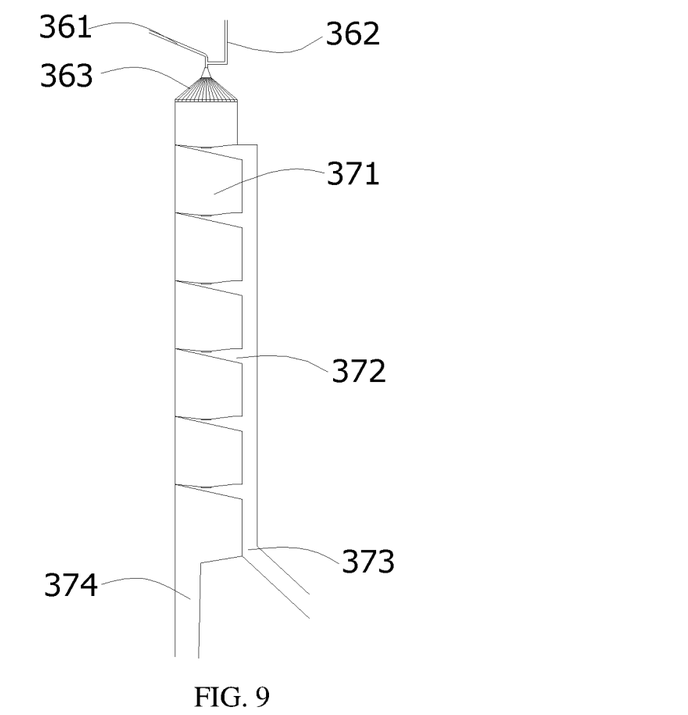
FIG. 9 and FIG. 10 are the structure diagrams when the diversion settlement zone is the second embodiment.
Figure 10:
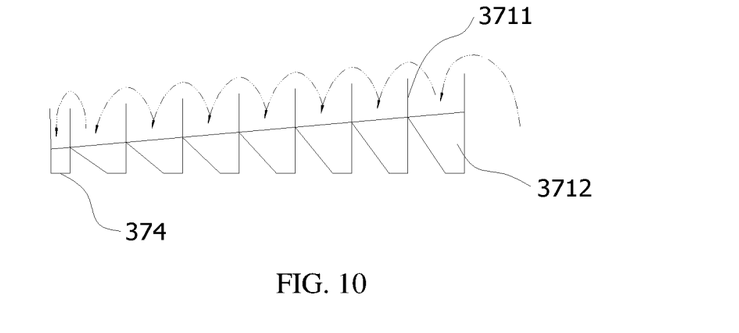

As shown in FIGS. 9-10, the diversion sedimentation zone includes an annular diversion sedimentation screen 40 and a magnetic concentrating shower 39, and the annular diversion sedimentation screen is spirally arranged downward around the central tank 21. In this embodiment, the first diversion sedimentation screen 32 of the defoaming zone extends to the inner side wall of the central tank body 21. After defoaming, the slime water that has not settled at the first diversion sedimentation screen 32 overflows the central tank body 21 to the entrance of the annular diversion sedimentation screen. A magnetic concentrating shower is arranged above the overflow port of each defoaming zone.

As shown in FIGS. 9-10, the annular flow-guided sedimentation screen 40 includes an annular groove 371 spirally arranged around the central groove body 21, and second spoiler baffles 3711 are sequentially arranged in the annular groove 371. The second underflow discharge port 3712 is provided on the bottom plate between two adjacent second turbulence partitions 3711, and the second turbulence partition 3711 increases the interference sedimentation effect of the fine coal slime. A second inclined plate diversion discharge pipe 372 is provided below the several second underflow discharge ports 3712, and the outlets of all the second inclined plate diversion discharge pipes 372 converge to the second underflow discharge pipe 373. That is, the settled material is discharged from the second underflow discharge pipe 373, and the settled water passes through the second baffle plate 3711 in the annular groove 371, and then flows from the second overflow discharge pipe 374 arranged at the end of the annular groove 371 and enters the washing process again as circulating water to realize a closed loop.

As shown in FIG. 9, the magnetic concentrating shower 39 includes a second magnetic concentrating ejection tube 361, a second magnetic powder feeding pipe 362, and a second distributor 363. The upper end of the second magnetism collecting and ejecting tube 361 is communicated with the feed distribution tank 11, and the lower end is communicated with the second distributor 363. One end of the second magnetic powder feed pipe 362 is connected to the pipe at the magnetic powder supply, and the other end is connected to the second magnetism collecting ejection pipe 361. The outlet of the lower end of the second distributor 363 is fan-shaped and is separated by a plurality of partitions, so that the magnetism collecting material at the outlet flows down evenly along the side wall of the deflector to realize fine coal accelerated sedimentation of mud. When the slime water passes through the annular diversion sedimentation screen 40, the magnetic concentrating shower 39 sprays the magnetic seeds to obtain efficient sedimentation.

Figure 11:
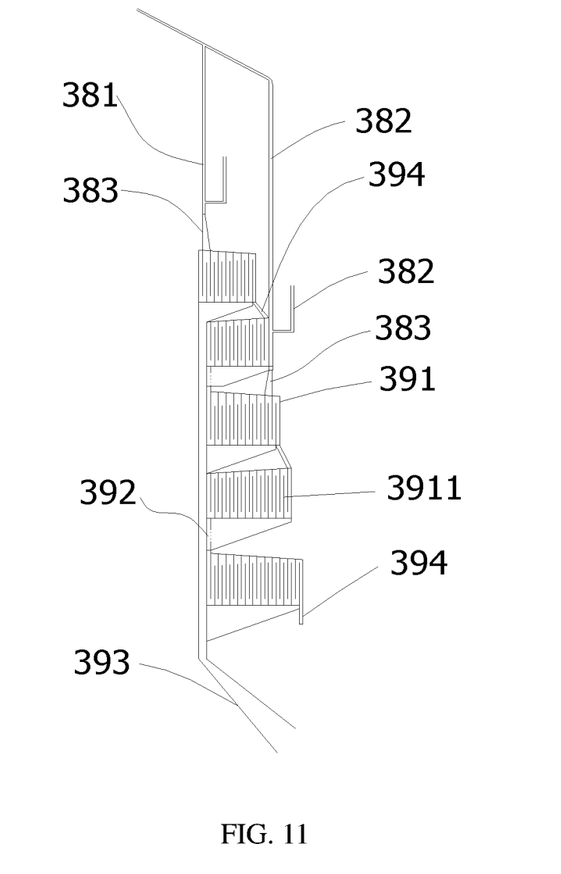
FIG. 11 is a structural diagram when the diversion settlement zone is the third embodiment.

As shown in FIG. 11, the diversion sedimentation zone includes a tiered diversion sedimentation screen 41 and a magnetic concentrating shower 39. The tiered diversion sedimentation screen 41 is arranged downwardly along the outer wall of the central tank body 21. In this embodiment, the first diversion sedimentation screen 32 in the defoaming zone extends to the inner side wall of the central tank body 21, and the slime water that has not settled at the first diversion sedimentation screen after defoaming overflows the central tank body 21 to the stratification diversion settling inside the screen. A magnetic concentrating shower is arranged above the overflow port of each defoaming zone.

As shown in FIG. 11, the laminar diversion sedimentation screen 41 includes multiple third diversion and sedimentation subgroups sequentially arranged downward along the outer wall of the central tank body 21, and each third diversion and sedimentation subgroup includes a sedimentation tank 391. Multiple third spoiler baffles 3911 are alternately arranged in the settling tank 391, and the third spoiler baffles 3911 can be alternately arranged on both sides of the settling tank 391 according to the arrangement of the high board 322 and the low board 323. Among them, the third spoiler baffle 3911 increases the interference sedimentation effect of fine slime.

The bottom plate of the sedimentation tank 391 is provided with a third underflow discharge port, and each sedimentation tank 391 is provided with a third inclined plate guide discharge pipe 392. The third inclined plate guide discharge pipe 392 collects the fine slime discharged from all the third underflow discharge ports in each sedimentation tank 391. All the outlets of the third inclined plate guide discharge pipe 392 are collected into the third underflow discharge pipe 393, and finally, the settled fine slime is discharged from the third underflow discharge pipe 393.

After the unsettled part of the slime water passes through all the third baffle plates 3911 in each third diversion and settlement subgroup, it is output from the connecting pipe 395 to the entrance of the next third diversion and settlement subgroup to the lowest third diversion and sedimentation subgroup. The completely settled water is output from the third overflow discharge pipe 394 at the output end of the bottom third flow sedimentation subgroup, and enters the washing process again as circulating water to achieve closed loop.

Referring to FIG. 11, the magnetic concentrating shower 39 includes a third magnetism-concentrating ejection tube 381, a third magnetic powder feeding pipe 382 and a third distributor 383. The upper end of the third magnetism-concentrating ejection tube 381 also communicates with the feed distribution tank 11, and the lower end communicates with the third distributor 383. One end of the third magnetic powder feed pipe 382 is communicated with the pipe at the magnetic powder supply, and the other end is communicated with the third magnetism-concentrating ejection tube 381. The outlet at the lower end of the device 383 is fan-shaped, and is separated by multiple baffles, so that the magnetizing materials at the outlet flow down evenly along the side wall of the deflector to realize the accelerated settlement of the fine slime. When the slime water passes through the stratified diversion settling screen, the magnetic concentrating shower sprays the magnetic seeds to obtain high-efficiency settlement. Then, the fine slime is fully settled in this process and separated from the water more thoroughly. In order to achieve a better sedimentation effect, in this solution, magnetic concentrating showers are respectively arranged at the input ends of the multiple third diversion sedimentation subgroups.

Figure 12:
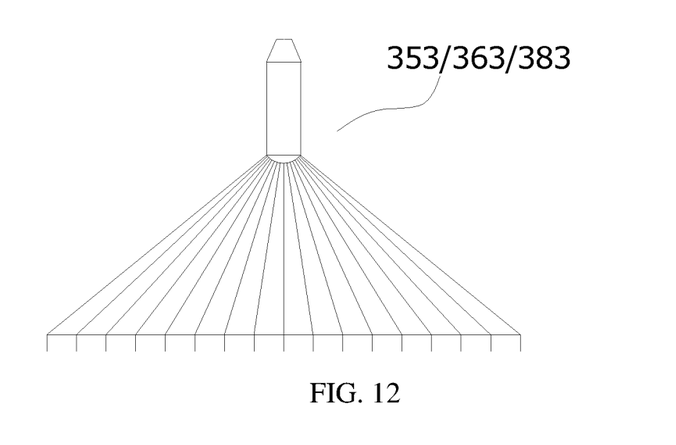
FIG. 12 is a structural diagram of the first distributor, the second distributor, and the third distributor.

As shown in FIG. 12, the structures of the first distributor 353, the second distributor 363, and the third distributor 383 are all the same. The use of a multi-channel distributor makes the distributor more uniform and does not require rake stirring during the working process, thoroughly solving the "harrowing" phenomenon and ensuring the continuous and stable operation of the thickener.

To sum up, in the clean coal collection assembly, the structure of the central collection area 31, the bubbles deforming area, and the three diversion and settlement areas are arbitrarily combined to form different technical solutions.

The above are only the preferred embodiments created by the present disclosure, and are not intended to limit the creation of the present disclosure. Any modification, equivalent replacement and improvement made within the spirit and principle of the present disclosure should be included in the disclosure. Within the scope of protection.

The description of the above embodiments is intended to enable those skilled in the art to implement and use the disclosure, and is not intended to limit the disclosure. Any modifications, changes and replacements made by those skilled in the art without departing from the spirit of the disclosure should fall within the scope of the disclosure.

What is claimed is:

1. A multi-stage sedimentation rake-free thickening device comprising:
   a central tank;
   an outer side of the central tank being provided with a diversion sedimentation zone, and the diversion sedimentation zone including an annular diversion sedimentation screen and a concentrated magnetic shower;
   wherein the annular diversion sedimentation screen includes an annular groove spirally arranged around the central tank;
   the annular groove is sequentially arranged with a second spoiler baffle;
   a lower bottom plate of the annular groove is also provided with a plurality of second underflow discharge ports, and a second inclined plate guide discharge pipe is provided below the plurality of second underflow discharge ports;
   outlets of the second inclined plate guide discharge pipe converge to a second underflow discharge pipe;
   settled water is discharged from the second overflow discharge pipe arranged at an end of the annular groove;
   the device further comprises a feed assembly, a diversion assembly, a central collection area, and a bubbles deforming area;
   a slime water is mixed with a treatment agent through the feed assembly and flows from an upper part of the central tank to an inner wall of the central tank, and then to a middle of the central tank through a guide assembly;
   the slime water and treatment agent form bubbles and carry fine slime upwards to a clean coal collection assembly after reaction;
   the central collection area and the bubbles deforming area are located above an outlet of the diversion assembly;
   the slime water containing fine slime passes through the central collection area, the bubbles deforming area and a diversion sedimentation zone in sequence;
   the feed assembly includes a feed distribution tank, a main feed pipe and a plurality of reducing pipes;
   the plurality of reducing pipes are evenly provided between the feed distribution tank and a side wall of the central tank;
   a treatment agent ejector is also provided at a protrusion of the reducing pipes;
   the concentrated magnetic shower comprises a second magnetic concentrating ejection tube, a second magnetic powder feeding tube and a second distributor;
   an upper end of the second magnetic concentrating ejection tube communicates with the feed distribution tank in the feed assembly, and a lower end communicates with the second distributor; and
   one end of the second magnetic powder feeding tube is communicated with pipes of a magnetic powder supply, and the other end of the second magnetic powder feeding tube is communicated with the second magnetic concentrating ejection tube.

* * * * *